Figure 1:
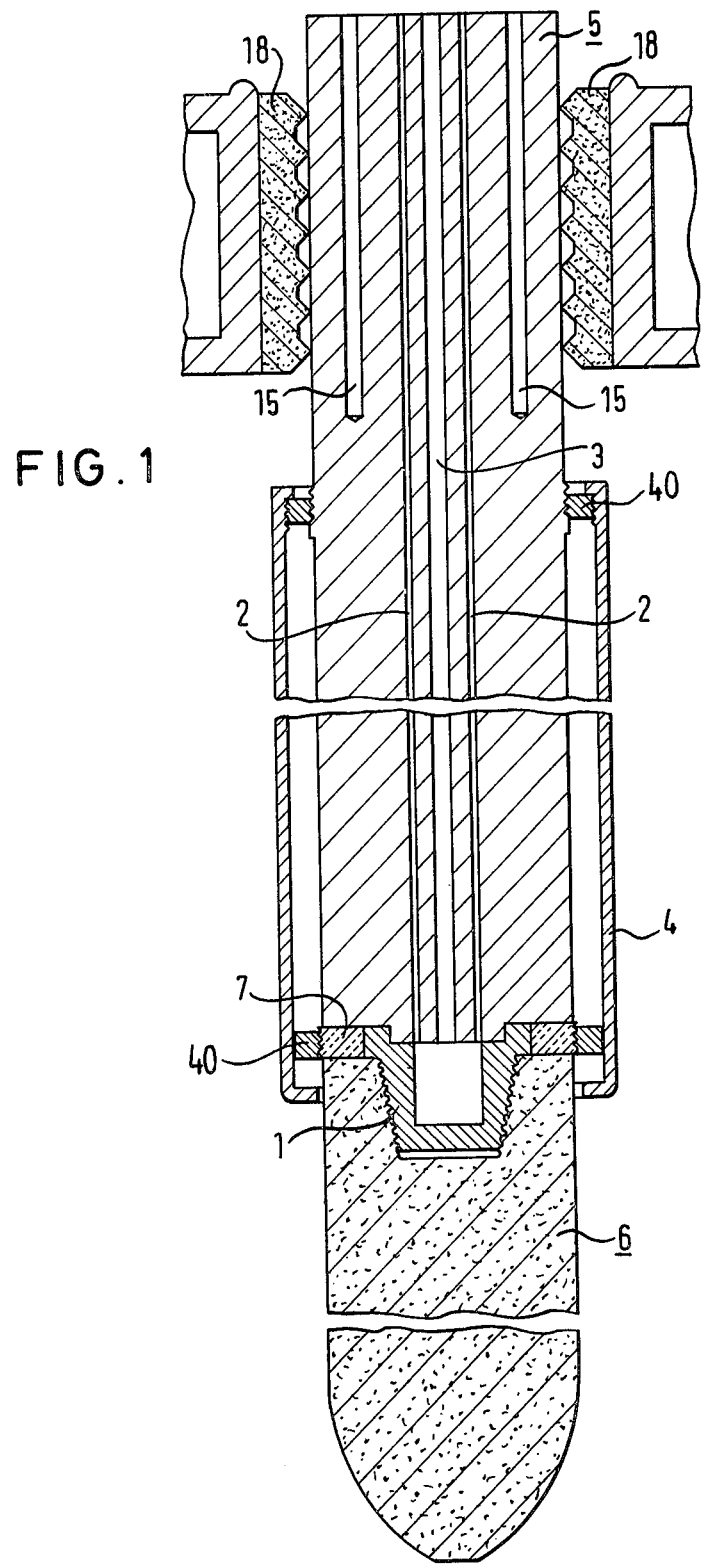

United States Patent [19]

Zöllner et al.

[11] Patent Number: 4,474,613
[45] Date of Patent: Oct. 2, 1984

[54] ELECTRODE FOR FUSION ELECTROLYSIS

[75] Inventors: Dieter H. Zöllner, Clare, Ireland; Friedrich Rittmann, Nuremberg, Fed. Rep. of Germany; Inge Lauterbach-Dammler, Nuremberg, Fed. Rep. of Germany; Konrad Koziol, Röthenbach a.d. Pegnitz, Fed. Rep. of Germany; Christine Zöllner, Nuremberg, Fed. Rep. of Germany

[73] Assignee: C. Conradty Nürnberg GmbH & Co. KG, Rothenbach a.d. Pegnitz, Fed. Rep. of Germany

[21] Appl. No.: 342,488

[22] Filed: Jan. 25, 1982

[30] Foreign Application Priority Data

Jan. 28, 1981 [DE] Fed. Rep. of Germany ....... 3102766

[51] Int. Cl.³ ..................... C25B 11/00; H05B 7/101
[52] U.S. Cl. ................................ 204/286; 204/297 R; 373/91; 373/93
[58] Field of Search .......... 204/274, 280, 286, 297 R; 373/91, 93

[56] References Cited

U.S. PATENT DOCUMENTS 1,982,009 11/1934 McKinney ........................ 204/274
4,145,564 3/1979 Andrew ........................... 373/93
4,172,023 10/1979 Friedli et al. .................... 204/280
4,280,891 7/1981 Neelameggham ............... 204/274
4,287,381 9/1981 Montgomery ..................... 373/93
4,291,190 9/1981 Elsner et al. ....................... 373/93

FOREIGN PATENT DOCUMENTS 2065708 7/1981 United Kingdom ............... 204/286

Primary Examiner—John F. Niebling
Attorney, Agent, or Firm—Lyon & Lyon

[57] ABSTRACT

An electrode for fusion electrolysis comprising an upper portion (5) of metal and a replaceable lower portion (6) of self-consuming or of slowly self-consuming material which are interconnected by a screw-nipple (1) or the like, whereby the upper portion may have a cooling device with a feed duct (2) and a return duct (3) and the upper portion (5) has at least partially and preferably in its lower region a protective covering, whereby this covering is a detachably surmounted sheath (4) of mechanically resistant material, which is electrically conductive. The sheath can be sub-divided into individual segments, while the design of screw-mounted units with internal recesses for the acceptance of resilient, electrically conductive materials reveals especially favorable properties.

19 Claims, 6 Drawing Figures

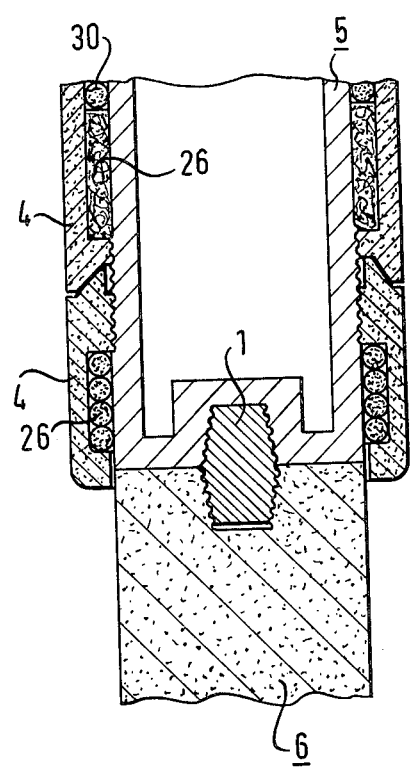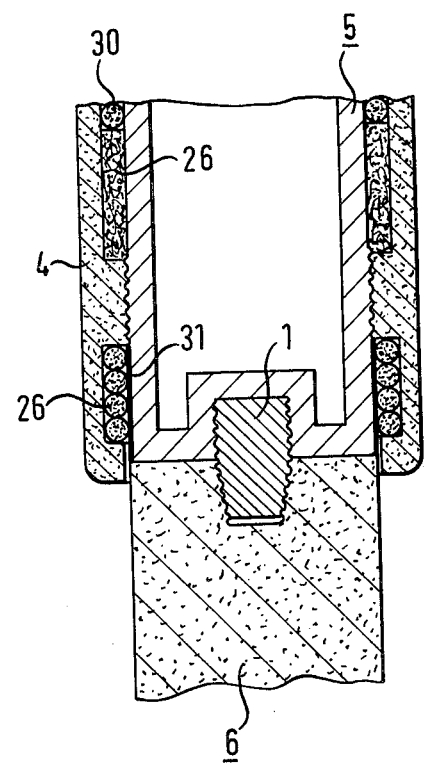

ELECTRODE FOR FUSION ELECTROLYSIS

The invention concerns an electrode for fusion electrolysis comprising an upper portion of metal and a replaceable lower portion of a self-consuming or non-consumable material, which are interconnected by means of a screw nipple, a clamping connection or the like, whereby the upper portion optionally has a cooling device and said upper portion has at least in its lower region a protective covering.

What is meant by fusion electrolysis are especially processes for the extraction of metals such as Al, Mg, Na, Li, etc., which because of the negative potential are not separable from aqueous solutions.

The use of combination electrodes which consist of an electrode holder with an active portion adjoined thereto for use in fusion electrolysis is known. The metallic electrode holder is intended not only to secure the active portion mechanically, but also to supply the current. Further from DE-OS No. 24 25 136 non-consumable anodes are known for fusion electrolysis, in which by local cooling a slag layer forms on the unprotected current supply and on the unprotected anode or the uncooled anode arrangement is screened from the electrolytes by stable, electrically insulating material.

These designs, like the design solutions in the field of electrodes for electrosteel manufacture, have the disadvantage that the slag adheres too strongly to the oxide ceramic or to the refractory nitrides and causes excessive crust formations, which make the handling of the anodes impossible and at every necessary exchange of the active portions, lead to severe damage to the protective covering and to the metal shanks.

Accordingly the object of this invention is to create electrode designs with a longer service life, lower current and voltage drop in the supply, which are however as trouble-free as possible, yet are also easy to produce and to repair. Moreover the electrode designs should possess certain emergency operating properties, when the active portion of the electrode is destroyed, consumed or is passivated.

This object is attained by an electrode of the type named above which is characterized in that the protective covering is a detachably surmountable sheath made of mechanically and chemically resistant material, which is electrically conductive.

In particular it has been shown that adequate protection both mechanically and thermally of the upper portion of highly conductive metal with a relatively low melting point is attained by the choice of a detachably surmountable sheath which is mechanically resistant, corrosion-stable, and electrically conductive. The methods mainly used in the past to protect the sensitive metal shank of combination electrodes, i.e. the direct application of insulating, ceramic layers on the transitional area of the water-cooled metal shank to the active portion of graphite or conductive oxide ceramic and the like, cannot meet the special stresses occurring during the use of the electrodes, especially the alternating thermal stresses, the high temperature stresses and in particular thermal shock while at the same time maintaining mechanical and thermal ruggedness. By the selection of materials which are good electrical conductors and mechanically robust which can be detachably surmounted, a noticeable improvement can be obtained.

Advantageous embodiments of the inventive electrode are disclosed in the sub-claims.

According to the invention it is possible to keep the sheath approximately in the range of the electric potential of the electrode. This can be achieved for example by the direct placing of the sheath on the upper portion of metal, hereinafter called the metal shank, or by electrically conductive connection with the latter. To the extent that the sheath is introduced into the cell expediently the sheath is composed of a material with adequately high melting point and stability against the electrolysis medium and/or the substances developed thereby. Expediently materials can be selected which have good electrical conductivity. Especially preferred is a specific electrical resistance of less than 100$\Omega$ mm$^2$/m. The electrode thus possesses on its upper portion a first, external, mechanically resistant and temperature resistant outer sheath, which is detachably surmounted. It absorbs the mechanical, thermal and corrosive loadings which can arise in fusion electrolysis and thereby ensures the continuity of the electrode process via the internally disposed inner core, which is connected to the current supply.

Alternatively it is also possible to maintain or surmount the sheath on the upper portion so as to be electrically insulating. In such a case it may be expedient to keep the sheath which is electrically insulated from the upper portion at earth potential. In this case, resistant sheath materials with lower electrical conductivity may be used.

Regardless of the type of the insulating or electrically conductive connection with the metal shank of the sheath, this can be effected by intermediate members or by spacers. They are preferably selected from temperature resistant materials. It may also be advantageous if this material is a poor heat conductor. But the sheath can also be applied by a homogenous or raster-shaped intermediate layer on the metal shank, which does not cause an undetachable or poorly detachable connection with the sheath. Depending on whether the sheath is to be maintained at electrode potential or at earth potential, the intermediate layer can be electrically conductive, which is especially preferred, or electrically insulating. The choice of resilient or springy intermediate layers has proven to be especially favorable, which are well able to withstand the vibrations and other mechanical stresses on the electrode.

Moreover it is also possible to suspend the sheath in sleevings or in recesses in the upper portion. On the other hand design solutions in which the inner core is connected with the outer sheath by one or more screwthreadings or by its design as a register member have been found especially suitable since in the event of necessary repairs, the separation is made easy. Expediently when designing the sheath and the metal shank, a partial screwthreading can be provided for register members.

The sheath may also have a cooling system. Thus cooling slots for gas-cooling, but also a liquid-cooling circuit may be provided. In the latter case, the sheath may e.g. be a double-jacketed tube, into which gas e.g. air, nitrogen or argon, or liquid can be fed and extracted. This can evidently be done in varied ways, e.g. by axial or spiral guidance of the cooling ducts etc. In individual cases the sheath can be a tube surrounding the upper portion and made of high-melting, high-temperature resistant steel, which is provided with cooling ducts, whereby the the steel tube is supported on the metal shank, which preferably is made of copper or another highly conductive metal or metal alloy.

It can be advantageous at least partially to draw the sheath around the end face of the upper portion, in order to protect the latter from the direct attacks of the electrolyte or of substances produced thereby. Here the sheath portion which is wrapped around the end face can be in conductive contact with the consumable bottom portion, which in general is made of carbon material, such as graphite or electrically conductive ceramic material, such as tin oxide, or can only be spaced slightly therefrom. This ensures that if the active portion drops out, the current flow passes through the outer sheath, but not through the end face of said upper portion. Optionally for the end face of the upper portion's additional protection, the sheath can have an insulating insert, e.g. a ceramic ring, etc. against the "active portion" of the electrode.

Between the sheath and the metal of the upper portion, an intermediate layer can advantageously be provided. This intermediate layer, depending on whether the external sheath is to be maintained at the potential of the electrode or at earth potential, can be electrically conductive or electrically insulating. Via the intermediate layer, either alternatively or additionally to the holders or intermediate members which are otherwise provided, a still better support of the sheath on the metal shank can be ensured. The intermediate layer can cover the entire space between the sheath and the metal of the upper portion, but alternatively it may also be present only in partial areas. This aims for not only the application of the intermediate layer in raster form, but also with especial advantage the continual support of the sheath in certain circumstances in the areas of special stress. An especially favorable embodiment of the invention is aimed at the provision of materials which possess resilient or spring-like qualities.

For example carbon fibers, carbon cord, carbon powder, graphite film, granular graphite, copper wire or a combination thereof may be used as such materials, whereby they provide an electrically conductive intermediate layer.

If it is desired to design the intermediate layer to be electrically insulating, for example non-conductive ceramic fibers, glass fibers etc. can be used. A further favorable material for the intermediate layer is provided by synthetic resins which can ensure a resilient seating of the sheath on the metal shank of the combination electrode. Suitable usable synthetic resins are for example those which are known for the manufacture of the insulating parts of high voltage circuit breakers or as the basis for printed circuits etc. Naturally it is also possible to use combinations of such materials, whereby this can be oriented according to the type of the sheath, the stress on the electrode and its design. Thus for example the use of high temperature resistant, conductive felt or such fibers, slivers or fabrics is especially preferred, particularly for those applications in which the electrode is exposed in use to mechanical shocks or vibrations, so that it is important that the external sheath should be resiliently and electrically conductively supported, which contributes to the additional stabilization of the electrode.

According to a specially preferred embodiment of the invention, the sheath is formed from a plurality of elements, particularly of segments. They can comprise a series of tubular portions, half-shells or the like which at least surround the lower region of the electrode's upper portion as far as the area of the screw nipple, and where appropriate further still. In particular the sheath can be made to surround the so-called "three-phase area", i.e. the area which is exposed to the electrolysis medium in the transition area to the atmosphere. The use of substantially tubular portions is especially preferred. It can also be advantageous if the individual segments bear upon each other so that in the event of a fracture or the failure of the bottom segment, the upper segment can slide into the zone of special stress. In such a case it is expedient to mount only the bottom segment of the sheath on the metal shank or on retainers or on intermediate members, so that the surmounted segments are freely movable.

In another embodiment of the electrode it is specially preferred when the sheath consists of segments whereby each individual segment may be connected with the metal of the top portion by means of screwthreading. This provides a particularly strong, easily detachable but still stable positioning of the segments on the metal of the top portion. Using this arrangement it is possible to displace the segments and/or tubular portions of the sheath successively from below upwards by means of a corresponding screw motion. This is done in order that the lower segments exposed to greater wear and tear, which have already been somewhat attacked but are still suitable for the protection of the upper portion of the metal shank, can be moved upward, and that from below, new segments or segments mounted earlier on the upper portion of the metal shank and/or tubular portions can be arranged on the lower portion of the metal shank. To do this, it is only necessary for the screwthreading to be suitably designed. This measure has the advantage that the tubular portions or segments of the sheath can be used as long and as economically in terms of materials as possible.

It is advantageous for the end faces of the segments to be profiled or otherwise designed so that the segments provide good cover for the core. This can be achieved in that the end faces of the segments engage with each other and/or are profiled. The profiling is especially intended to provide a labyrinth seal for the sheath.

According to a preferred embodiment of the invention, the profiling of the one segment has at least one annular protuberance, which engages in an annular groove of the profiling of the adjacent segment. Here it has been found especially suitable for the annular protuberance of the one segment as well as the annular groove of the adjacent segment to be designed to be somewhat trapezoidal in cross-section.

It is an advantage to design the individual segments so that there are recesses on their inner face. These recesses are especially annular. Into them the materials of the electrically conductive or electrically insulating intermediate layer can be placed. In these recesses it is advantageous to introduce carbon fibers, or carbon-felts, -cords, optionally in combination with graphite film, whereby the individual segments connected with the core by a screwthreading are mounted especially resiliently. In the case of these and other embodiments it is favorable within the scope of the invention for the segments to be designed of graphite. Such an embodiment of the inventive sheath is shown in the FIGS. 4 to 6, to which attention is now expressly drawn for this reason.

For many applications it is especially favorable for the carbon material forming the sheath and/or its segment to be impregnated.

It is also possible that the sheath and/or its segments has/have high temperature resistant coating.

According to the invention an electrode is especially preferred in which in the lower region of the metal shank, to which the active portion is connected, the sheath is divided into individual segments which are made preferably of graphite, and whereby optionally between the graphite segments and the metal shank, a buffer is provided by the insertion of conductive fabric or felt, or by the insertion of sealing materials to form a gastight or liquid-tight seal. A refractory compound, which can be applied e.g. by spraying, can adjoin the segments in the direction of the upper portion of the metal shank. Additional adhesion to the refractory compound can be provided by the use of retainers, e.g. welded hexagonal grid members etc. As a rule it is ensured that these retainers are also covered by the refractory layer.

A number of advantages are attained by the inventive design of the protective covering. In particular, an especially effective protection is achieved for the transitional zone of the (water) cooled metal shank against the active portion, e.g. of graphite. The inventive design of the sheath as a detachable moulding which is electrically conductive and can be segmented fully meets the demands of the alternating thermal stresses and of the mechanical loading, but in particular of the vibration. Due to the choice of electrically conductive materials with good mechanical stability and especially their design and fastening to the metal shank, high operational reliability results with long service life of the combination electrode. Due to the separate design of a detachably surmountable sheath, especially in positively engaged segment form, and preferably of graphite, it is possible to place the fastening devices on the metal shank in zones of lesser stress and thereby to avoid optimally a fracture of the sheath material, e.g. of graphite, in this area.

Figure 2:
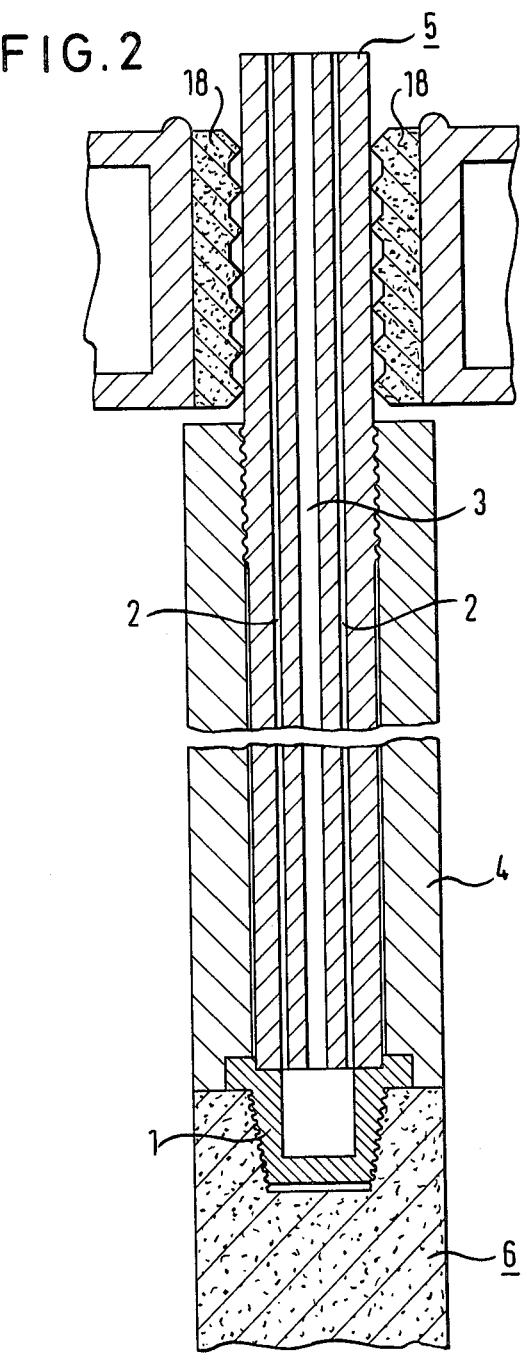
Figure 3:
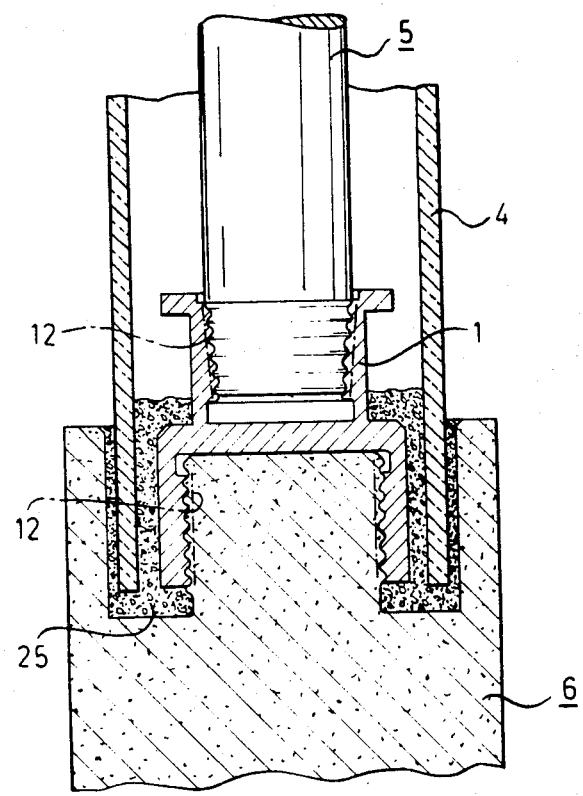
Figure 6:
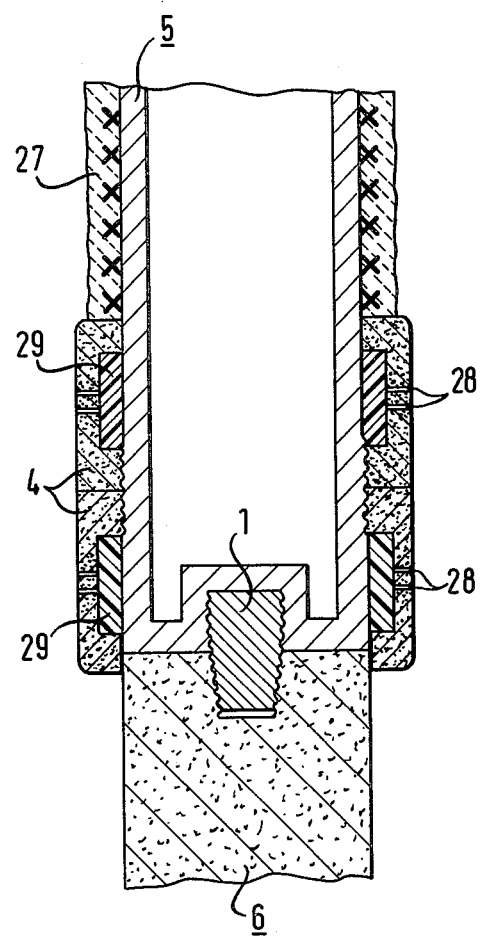

Some embodiments of the invention which are especially preferred are disclosed in the figures below. These show:

FIG. 1 a longitudinal section through an electrode of the inventive type,

FIG. 2 a longitudinal section through another embodiment of an inventive electrode, FIG. 3 a longitudinal section in the transition zone of an electrode, FIGS. 4-6 diagrammatic views of the segmental design of the sheath in partial longitudinal section.

In the electrode of FIG. 1, the coolant, e.g. water or air, is led in via the feed duct 2 and returned via the return duct 3. The coolant also enters a chamber inside screw nipple 1. The upper portion 5, usually of copper or another highly conductive metal, is surrounded by an annular sheath 4, which surrounds the lower region of the metal shank and is spaced therefrom. It is screwed onto the metal shank by a screwthreaded disk 40. In the lower region of said metal shank the sheath 4 is held spaced by an intermediate member 7, on which a further screwthreaded disk 40 is connected.

In the upper region of said metal shank, jaws 18 for the current supply are shown, while in the metal shank cooling bores 15 are provided.

FIG. 2 shows the sheath as a register member beginning below the current supply 18, which is additionally screw-mounted in its upper portion by a screwthread to the inner metal shank, which supports the cooling system 2, 3. Whereas for the inner, current-supplying shank a highly conductive metal e.g. copper is used, it is possible to design the protective outer sheath of a material which is mechanically very rugged, with a high melting point and good thermal stability. The electric conductivity of the outer sheath can be less than that of the inner metal shank, since its conductivity has only to provide the emergency operating properties. According to the invention it is possible to insert in the recess between the inner metal shank and the outer sheath a buffer material such as felt, slivers of ceramic fiber or carbon, and/or graphite film, which is not shown however in FIG. 2.

FIG. 3 shows a partial section in the area of the nipple connection of metal shank 5 with the active portion 6, whereby the respective screwthreading is equipped with a coating increasing its conductivity 12. The electrically conductive sheath 4 is again designed as a tube, which apart from a fastening on shank 5 (not shown) is also supported in a recess of the active portion 6. In this recess a high temperature resistant compound 25 is inserted which, depending on the design of the electrode, can be electrically conductive or insulating.

FIG. 4 shows an especially preferred embodiment of the individual segments of sheath 4. These segments are screwed by a screwthreading to the external wall of the metal shank 5. The segments are designed trapezoidally on the end faces and thereby provide a labyrinth seal. In recesses on the inner face of the segments, carbon cord and also carbon felts 26 are inserted. The design of the sheath 4 and of the individual segments can be varied.

FIG. 5 shows a segment which is screwed onto the metal shank 5 by a centrally-located screwthreading. Resilient or springy materials e.g. glass fibers 26 or rubber rings 30 are placed in the recesses on the interior of the segments. Additionally a graphite film 31 can be provided.

FIG. 6 again shows a somewhat differently designed profile into the inner chambers or boreholes 28 of which injected synthetic resin substances are introduced and can be condensed in situ. A refractory compound is sprayed on hexagrids 27 in the top part of the metal shank.

As the mechanically-resistant material for the sheath which is electrically conductive, in particular those materials with a high melting point and high thermal stability which are also stable against alternating temperature stresses can be used. The materials can be chosen in individual cases from highly thermal resistant steels, metals, e.g. aluminum, and especially from its alloys. For many applications the carbides, nitrides or oxides of such metals can be used.

Carbon material and especially graphite can be used as the "mechanically resistant" material in the sense of the invention, especially when the graphite is impregnated and/or due to the special design as individual segments it is especially conditioned for mechanical stress, preferably by a resilient intermediate layer, but also optionally by its dimensions.

Alternative solutions include materials such as silicon carbide, silicon nitride, clay graphite. The sheath material currently preferred for the invention is graphite and other carbon materials.

We claim:

1. A fused bath electrolysis electrode for use in producing Al, Mg, Na and Li and the like through a fused bath electrolysis process, said electrode comprising a metallic upper portion having upper and lower ends, a replaceable lower portion of a self-consuming or non-consumable material, a threadable interconnection joining said upper portion and said lower portion, said upper portion including a cooling device having a feed duct and a return duct, said upper portion having at least in its lower area a protective covering being constituted by a generally cylindrical sheath located about said upper portion and extending to the lower end of said upper portion, the sheath being made of mechanically and chemically resistant electrically conductive material, and means including a detachable connection between said sheath and said upper portion of the electrode detachably securing the sheath on said upper portion while permitting ready detachment of the sheath from said upper portion.

2. The electrode according to claim 1 wherein said sheath includes a plurality of generally cylindrical segments situated along said upper portion of the electrode.

3. The electrode according to claim 1 wherein the sheath is arranged to be maintained at an electric potential of the electrode.

4. The electrode according to claim 1, wherein the sheath is electrically insulated from the upper portion.

5. The electrode according to claim 4, wherein the sheath is suspended in a recess of said upper portion.

6. The electrode according to claim 1, wherein the sheath is a surmounted tube.

7. The electrode according to claim 1, wherein the sheath is partly drawn around the bottom end face of the upper portion, whereby optionally the portion of the sheath around the end face is in electrically conductive contact with the lower portion or is slightly spaced therefrom.

8. The electrode according to claim 1, wherein the sheath in the area of the lower portion is separated therefrom by an insulating unit.

9. The electrode according to claim 3, including an intermediate layer between the sheath and the upper portion.

10. The electrode according to claim 9, wherein said intermediate layer is made of resilient material.

11. The electrode according to claim 10, wherein the intermediate layer is of an electrically conductive material.

12. The electrode according to claim 1, wherein at least a segment of the sheath is connected with the upper portion by screw threading.

13. The electrode according to claim 1, wherein at least one segment of the sheath is made selectively of a transitional metal, metal alloy, or metal compound with high melting point and high thermal stability, or carbon materials, optionally impregnated, whereby the named materials have an electrical resistance of less than $100\Omega$ $mm^2/m$.

14. The electrode according to claim 2, wherein the profiling of one of the sheath segments has at least an annular protuberance which engages in an annular groove of the profiling of the adjacent sheath segment.

15. The electrode according to claim 14, wherein both the annular protuberance on one segment and the annular groove on the adjacent segment are approximately trapezoidal in cross-section.

16. The electrode according to claim 2, wherein at least one of the sheath segments have a coating with stability at high temperature.

17. The electrode according to claim 2, including, between said segments and the metal of the upper portion, an application separately or in combination of graphite film or synthetic resin.

18. The electrode according to claim 2, wherein the protective covering is a sprayed refractory compound in the upper portion and said protective covering extends between the upper region of the adjacent adjoined thereto segments.

19. The electrode according to claim 1 wherein the sheath includes a surmounting, at least in the sheath area arranged to contact with the electrolytes and the arising products, thereby to be sealed with respect to gas and liquids.

* * * * *

UNITED STATES PATENT AND TRADEMARK OFFICE
CERTIFICATE OF CORRECTION

PATENT NO. : 4,474,613

DATED : October 2, 1984

INVENTOR(S) : Dieter H. Zollner; Friedrich Rittmann; Lauterbach-Dammler; Konrad Koziol; and Christine Zollner It is certified that error appears in the above-identified patent and that said Letters Patent is hereby corrected as shown below:

On the title page;

German priority application No. "3102766" should read --3102776--

Signed and Sealed this

Third Day of September 1985

[SEAL]

*Attest:*

DONALD J. QUIGG

*Attesting Officer*   Acting Commissioner of Patents and Trademarks - Designate